(12) United States Patent
Berger et al.

(10) Patent No.: US 8,515,028 B2
(45) Date of Patent: Aug. 20, 2013

(54) SYSTEM AND METHOD FOR EXTERNALLY MAPPING AN INTERACTIVE VOICE RESPONSE MENU

(75) Inventors: Shai Berger, Toronto (CA); Jason P. Bigue, Toronto (CA)

(73) Assignee: FonCloud, Inc., Ontario (CA)

( * ) Notice: Subject to any disclaimer, the term of this patent is extended or adjusted under 35 U.S.C. 154(b) by 874 days.

(21) Appl. No.: 12/400,932

(22) Filed: Mar. 10, 2009

(65) Prior Publication Data

US 2009/0207980 A1 Aug. 20, 2009

Related U.S. Application Data

(63) Continuation-in-part of application No. 12/276,621, filed on Nov. 24, 2008.

(60) Provisional application No. 61/035,195, filed on Mar. 10, 2008, provisional application No. 61/035,204, filed on Mar. 10, 2008, provisional application No. 60/989,908, filed on Nov. 23, 2007.

(51) Int. Cl.
*H04M 11/00* (2006.01)

(52) U.S. Cl.
USPC ..................... 379/88.14; 379/93.17

(58) Field of Classification Search
USPC .......... 455/566; 379/201.04, 201.03, 201.12, 379/265.01, 265.09, 266.01, 215.01, 142.01, 379/142.04, 142.09, 201.02, 210.02, 210.03, 379/211.01, 68, 88.11, 88.13, 88.14, 93.17
See application file for complete search history.

(56) References Cited

U.S. PATENT DOCUMENTS

| | | | |
|---|---|---|---|
| 4,169,217 | A | 9/1979 | Szanto et al. |
| 4,228,324 | A | 10/1980 | Rasmussen et al. |
| 4,425,479 | A | 1/1984 | Dubner et al. |
| 4,731,822 | A | 3/1988 | Berry, III et al. |
| 4,834,551 | A | 5/1989 | Katz |
| 4,870,680 | A | 9/1989 | Ohtsuka et al. |
| 5,627,884 | A | 5/1997 | Williams et al. |
| 5,640,448 | A | 6/1997 | Toyoshima |
| 5,737,393 | A * | 4/1998 | Wolf .......................... 379/88.13 |
| 5,764,746 | A | 6/1998 | Reichelt |
| 5,802,526 | A * | 9/1998 | Fawcett et al. ............. 379/88.13 |
| 5,822,405 | A | 10/1998 | Astarabadi |
| 6,031,905 | A | 2/2000 | Furman et al. |
| 6,049,600 | A | 4/2000 | Nabkel et al. |
| 6,104,797 | A | 8/2000 | Nabkel et al. |
| 6,118,861 | A | 9/2000 | Gutzmann et al. |
| 6,122,346 | A | 9/2000 | Grossman |
| 6,141,328 | A | 10/2000 | Nabkel et al. |
| 6,195,417 | B1 | 2/2001 | Dans |
| 6,201,855 | B1 | 3/2001 | Kennedy |

(Continued)

FOREIGN PATENT DOCUMENTS

| | | |
|---|---|---|
| EP | 1156649 A | 11/2001 |
| JP | 2001285493 A | 10/2001 |

(Continued)

*Primary Examiner* — Olisa Anwah

(74) *Attorney, Agent, or Firm* — Carl M. Napolitano; GrayRobinson, P.A.

(57) ABSTRACT

An interactive voice response mapping system (IVRMS) is used in a transaction between a waiting party and a queuing party, with the queuing party having a queuing calling system (QCS), and the IVRMS adapted to communicate with the QCS and to build an IVR map of the QCS.

16 Claims, 5 Drawing Sheets

(56) References Cited

U.S. PATENT DOCUMENTS

| | | | |
|---|---|---|---|
| 6,501,750 B1 | 12/2002 | Shaffer et al. | |
| 6,512,852 B1 | 1/2003 | Lindholm et al. | |
| 6,563,921 B1 | 5/2003 | Williams et al. | |
| 6,584,184 B1 | 6/2003 | Nabkel et al. | |
| 6,594,484 B1 | 7/2003 | Hitchings, Jr. | |
| 6,643,641 B1 | 11/2003 | Snyder | |
| 6,674,725 B2 | 1/2004 | Nabkel et al. | |
| 6,694,008 B1 | 2/2004 | Mukherji et al. | |
| 6,724,885 B1 | 4/2004 | Deutsch et al. | |
| 6,754,334 B2 | 6/2004 | Williams et al. | |
| 6,757,260 B2 | 6/2004 | Pandit | |
| 6,763,090 B2 | 7/2004 | Che et al. | |
| 6,788,770 B1 | 9/2004 | Cook et al. | |
| 6,804,342 B1 | 10/2004 | Gadant | |
| 6,807,274 B2 | 10/2004 | Joseph et al. | |
| 6,813,636 B1 | 11/2004 | Bean et al. | |
| 6,836,478 B1 | 12/2004 | Huang et al. | |
| 6,914,962 B2 * | 7/2005 | Neary | 379/10.02 |
| 6,920,425 B1 * | 7/2005 | Will et al. | 704/275 |
| 6,990,524 B1 | 1/2006 | Hymel | |
| 6,999,944 B1 | 2/2006 | Cook | |
| 7,027,408 B2 | 4/2006 | Nabkel et al. | |
| 7,027,990 B2 * | 4/2006 | Sussman | 704/270.1 |
| 7,065,203 B1 | 6/2006 | Huart et al. | |
| 7,092,738 B2 | 8/2006 | Creamer et al. | |
| 7,113,987 B2 | 9/2006 | Nabkel et al. | |
| 7,120,244 B2 | 10/2006 | Joseph et al. | |
| 7,130,411 B2 | 10/2006 | Brown et al. | |
| 7,136,478 B1 * | 11/2006 | Brand et al. | 379/265.09 |
| 7,174,011 B2 | 2/2007 | Kortum et al. | |
| 7,215,759 B2 | 5/2007 | Brown et al. | |
| 7,221,753 B2 | 5/2007 | Hutton et al. | |
| 7,228,145 B2 | 6/2007 | Burritt et al. | |
| 7,251,252 B2 | 7/2007 | Norby | |
| 7,315,617 B2 | 1/2008 | Shaffer et al. | |
| 7,349,534 B2 | 3/2008 | Joseph et al. | |
| 7,414,981 B2 | 8/2008 | Jaramillo et al. | |
| 7,715,531 B1 * | 5/2010 | Golding et al. | 379/88.18 |
| 8,155,276 B2 | 4/2012 | Beauregard et al. | |
| 8,160,209 B2 * | 4/2012 | Wang et al. | 379/26.02 |
| 2003/0112931 A1 | 6/2003 | Brown et al. | |
| 2004/0202309 A1 | 10/2004 | Baggenstoss et al. | |
| 2005/0147219 A1 | 7/2005 | Comerford | |
| 2005/0147227 A1 | 7/2005 | Chervirala et al. | |
| 2006/0106613 A1 | 5/2006 | Mills | |
| 2006/0126803 A1 | 6/2006 | Patel et al. | |
| 2006/0245579 A1 | 11/2006 | Bienfait et al. | |
| 2006/0256949 A1 | 11/2006 | Noble | |
| 2007/0041564 A1 | 2/2007 | Antilli | |
| 2007/0071223 A1 | 3/2007 | Lee et al. | |
| 2007/0165608 A1 * | 7/2007 | Altberg et al. | 370/352 |
| 2007/0280460 A1 | 12/2007 | Harris et al. | |
| 2008/0039056 A1 * | 2/2008 | Mathews et al. | 455/414.1 |
| 2008/0144786 A1 * | 6/2008 | Wang et al. | 379/88.18 |
| 2008/0159495 A1 | 7/2008 | Dahan | |
| 2009/0149158 A1 | 6/2009 | Goldfarb et al. | |
| 2009/0154678 A1 * | 6/2009 | Kewin et al. | 379/201.01 |
| 2010/0057456 A1 * | 3/2010 | Grigsby et al. | 704/235 |
| 2011/0103559 A1 * | 5/2011 | Andrews et al. | 379/52 |

FOREIGN PATENT DOCUMENTS

| | | |
|---|---|---|
| JP | 2004304770 A | 10/2004 |
| KR | 20040039586 | 5/2004 |
| KR | 20040106487 | 12/2004 |
| KR | 1020050002930 | 1/2005 |

* cited by examiner

EDIT NODE                                                                X

QUEUING PARTY: <u>ACME</u>                              <u>LAST VALIDATED:</u>
NODE: <u>2</u>                                          <u>2/3/08 11:22</u>

PROMPT:     THANK YOU FOR CALLING US ...

COMMAND:    | 1 | TECH SUPPORT |
            | 2 | ADDRESS |

[DELETE NODE]  [ADD COMMAND]  [DELETE COMMAND]  [EDIT PROMPT TEXT]

*FIG. 4*

SYSTEM AND METHOD FOR EXTERNALLY MAPPING AN INTERACTIVE VOICE RESPONSE MENU

CROSS-REFERENCE TO RELATED APPLICATIONS

This application claims priority from U.S. Provisional Patent Applications having Ser. Nos. 61/035,195 and 61/035,204, both filed on Mar. 10, 2008 and is a Continuation-In-Part Application of U.S. Utility patent application Ser. No. 12/396,603, filed Mar. 3, 2009, which itself claims priority to Provisional Application Ser. No. 61/033,856, filed Mar. 5, 2008 and itself is a Continuation-In-Part Application of U.S. application Ser. No. 12/276,621 filed Nov. 24, 2008, which itself claims the benefit of U.S. Provisional Patent Application Ser. No. 60/989,908, filed Nov. 23, 2007, the disclosures of which are hereby incorporated by reference herein in their entireties and all commonly owned.

FIELD OF INVENTION

The present invention relates generally to communication call management and, more particularly, to Interactive Voice Response (IVR) systems.

BACKGROUND OF THE INVENTION

Today, when a user (waiting party) calls a large company or service center (queuing party), it is very likely that he or she (referred to collectively as "it" in this disclosure) will be connected to an Interactive Voice Response (IVR) system. Such systems present the waiting party with information via a series of audio prompts and receive input from the caller via dual tone multi-frequency (DTMF) tones (also known as "touch tones") or verbal commands.

An "IVR map" is a structured list of all the possible paths through a given IVR system, where each path consists of one or more nodes. FIG. 1 provides an illustrative example of such an IVR map. Each node in the map includes a prompt and possibly one or more commands. The prompt is the audio that is heard by the waiting party and is represented in the map by the corresponding text. A command allows the caller to navigate to another node. Examples of commands are DTMF tones and verbal commands. Each command will lead to another node in the IVR system, or will put the caller in a queue to speak to a live agent.

The strength of the IVR system is its universality. It works on any phone and is usable by even the least technically inclined people. IVR systems are favored by companies because they allow live agents to be used more effectively, which in turn reduces the costs of running call centers. Recent advances in technology are making IVR systems both easier to set up and more elaborate. Customer interactions that used to involve an agent—e.g. checking a bank balance, making a payment—are being delegated more and more to the "automated attendant". It's clear that IVRs are going to be used for the foreseeable future.

However, IVR systems can be very frustrating to the waiting party. By way of example:

1. Companies are putting more and more marketing messages into their IVRs, which provides no value to the waiting party and increases the time it takes him or her to accomplish desired objectives.
2. For really long menus, it can be hard for the waiting party to remember all the options by the time the menu completes.
3. Often the waiting party simply wants to speak to an agent, but the path to get there is not obvious. In fact, sometimes companies make reaching an agent deliberately obtuse.

SUMMARY OF THE INVENTION

The present embodiments provide in one aspect an interactive voice response mapping system (IVRMS) used in a transaction between a waiting party and a queuing party, the queuing party having a queuing calling system (QCS), the IVRMS adapted to communicate with the QCS and to build an IVR map of the QCS.

In another aspect, the present embodiments provide a method used in a transaction between a waiting party and a queuing party, the queuing party having a queuing calling system (QCS), the method comprising communicating with the QCS and to build an IVR map of the QCS.

BRIEF DESCRIPTION OF THE DRAWINGS

Embodiments of the invention are described by way of example with reference to the accompanying drawings, in which:

FIG. 4 is an illustration of an exemplary MEI screenshot.

DETAILED DESCRIPTION OF THE PREFERRED EMBODIMENTS

The present invention will now be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

The embodiments presented herein provide a system and method which allows the waiting party to review the IVR map of a queuing party in, e.g. in a visual way, thus saving time during the navigation process in a transaction which might be through a land phone, mobile phone, web-based phone, softphone, and the like.

Figure 1:
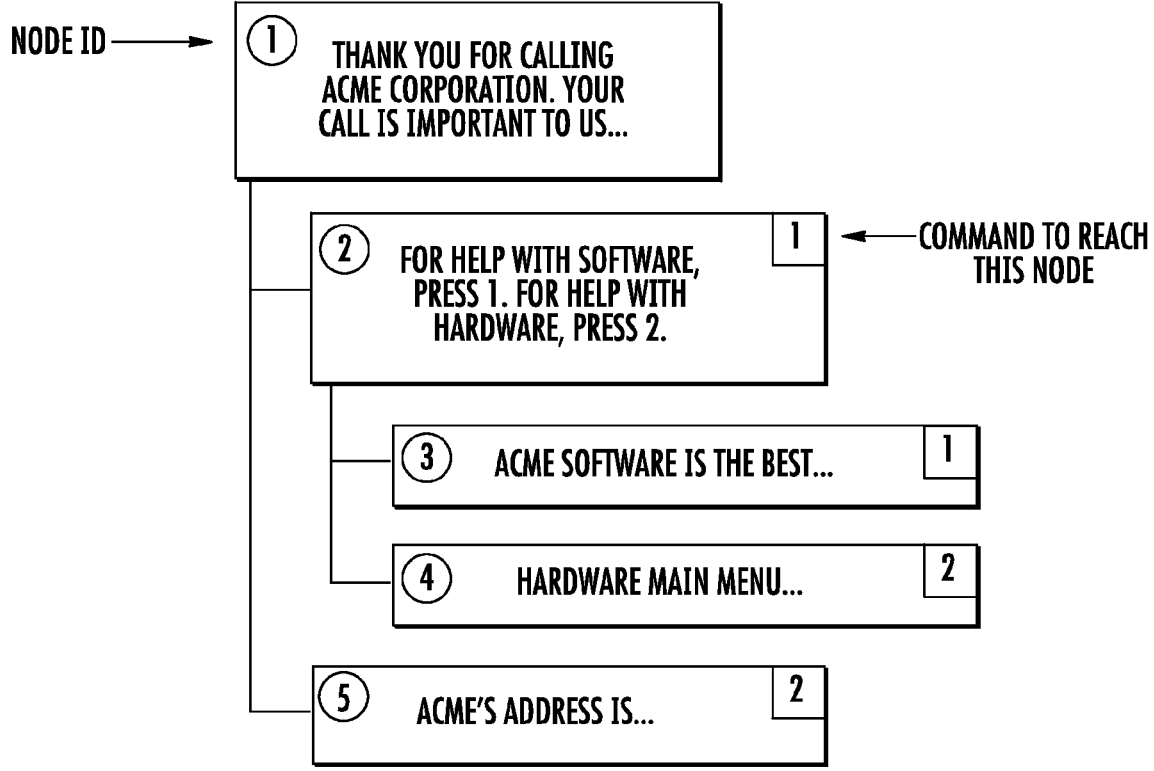
FIG. 1 is an illustration of an IVR map with commands and nodes.

Referring initially to FIG. 1, the queuing party could have the IVR map as herein shown by way of example, and the waiting party may want to reach technical support for a hardware problem. The illustration of FIG. 1 makes it clear that after dialing, the waiting party needs to press "1" and then "2". This approach is faster compared to dialing the number without the IVR map as a reference and listening through the menus. Because this example is simplified, the time savings is minimal, but in real-world cases, it can be much more substantial.

One difficulty in creating an IVR map is that, typically, the queuing party does not make available the contents of its IVR map in any way other than through dialing their phone system. Further, the queuing party may change the content or structure of its IVR map at any time. There is currently no system for notifying a third party of this change, hence an IVR map may become out-of-date at any time, without notice.

Figure 2:
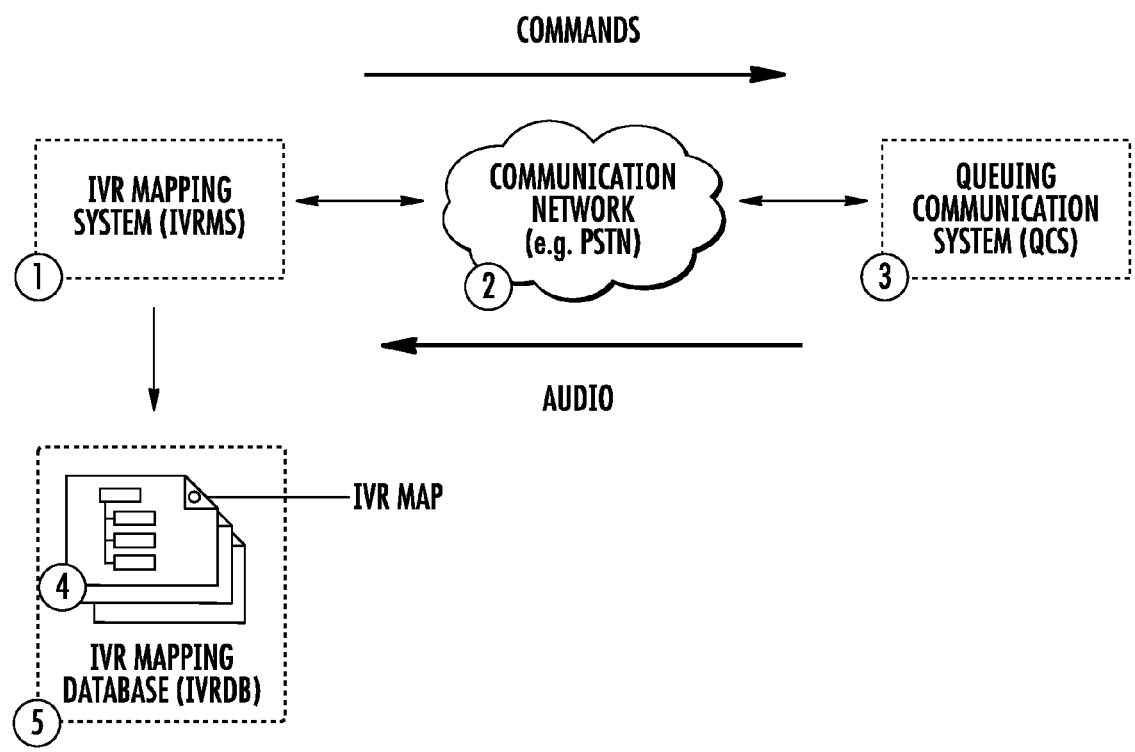
FIG. 2 is an illustration of an exemplary embodiment of an IVR mapping system (IVRMS) using a network to communicate with a QCS system and build an IVR map.

The embodiments presented herein provide a communications system referred to as the IVR mapping System (IVRMS) that is independent of the queuing party and of any telephone network carriers. FIG. 2 illustrates, by way of example, functions of an IVRMS 1. The IVRMS 1 connects through the communication network 2 (e.g. PSTN) with the queuing calling system (QCS) 3 of the queuing party (typically an IVR). The IVRMS generates an IVR map 4 for a given QCS which is in turn stored in a database called the IVR map Database (IVRMDB) 5.

It should be noted that present embodiments are applicable to landline phones, mobile and cellular phones, internet/web/IP-based phones or softphones etc. All the above devices could be identified with a voice address which could for example be a telephone number or an IP address. For instance, just as well as sending voice cues or composing numbers with a telephone, one could use data and software command transfer using internet/web/IP-based phones or softphones. It is therefore important to notice that the present embodiments relate to all these cases.

Functions of one IVRMS according to the teachings of e present invention may include:
1. Connect to the QCS over a communication network (e.g. PSTN).
2. Process the audio from the QCS and convert it to text or graphical representation.
3. Compare the audio or text with existing IVR map, if one exists.
4. Extract navigational information.
5. Send commands to the QCS (e.g. DTMF tones, voice cues, software commands, and the like).

The Editor

In some embodiments, the actions of the IVRMS are assisted by an editor. The tasks of the editor include at least one of the following:
1. Correcting mistakes in the automated speech-to-text conversion process;
2. Removing text that is not relevant for visual navigation (e.g. "press star to repeat this menu");
3. Correcting the structure of the IVR map by adding, removing or changing commands for particular nodes.

Figure 3:
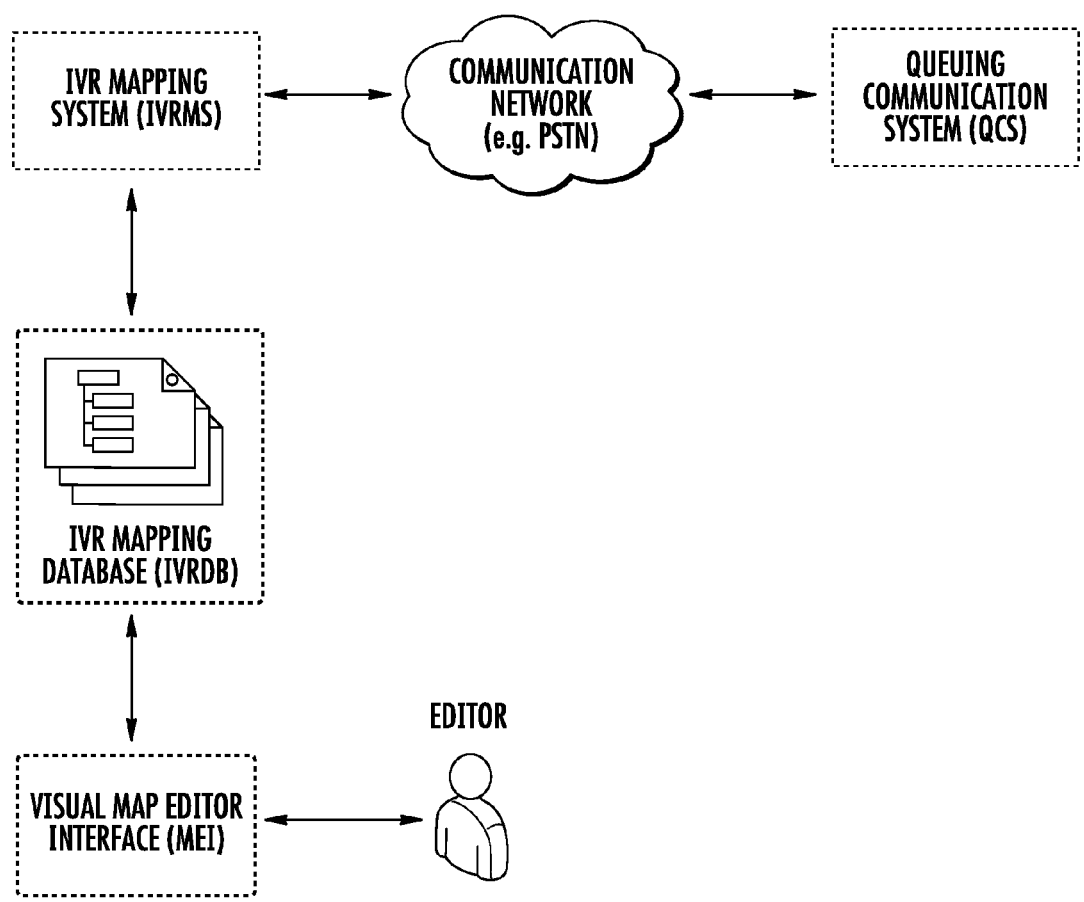
FIG. 3 is an illustration of an exemplary IVRMS with the option of capability of being edited by en editor through a visual map editor interface (MEI).

In some embodiments, the editor is presented with a visual interface, namely the map editing interface (MEI), that facilitates the editor's work. FIG. 3 shows an illustrative example involving an MEI and other relevant components.

FIG. 4 shows an exemplary representation of an MEI screenshot that allows the editor to make appropriate changes to a node in the IVRMDB.

It should be noted that editor might be a person, or it might also be a built-in software or hardware module inside the IVRMS, or an external software or hardware device interoperable with the IVRMS.

Map Validation

In some embodiments, the IVRMS performs a process called map validation, whereby it connects with the QCS and issues the appropriate commands to reach every node in the map. At each node, the IVRMS performs a process called node Validation whereby the incoming audio and/or text from a given node is compared with the stored audio and/or text for that node in the IVRMDB. If a certain threshold of matching is not met, then the node is flagged and, in some embodiments, an Editor is notified so that the node can be reviewed. The threshold levels may be set by the Editor on a per-node or per-map basis.

In some embodiments, map validation is performed on a regular schedule for each queuing party.

In some embodiments, some queuing parties may be designated as "frequently changing", and hence require more frequent map validation.

Regular Time-Based Map Changes

Figure 5:
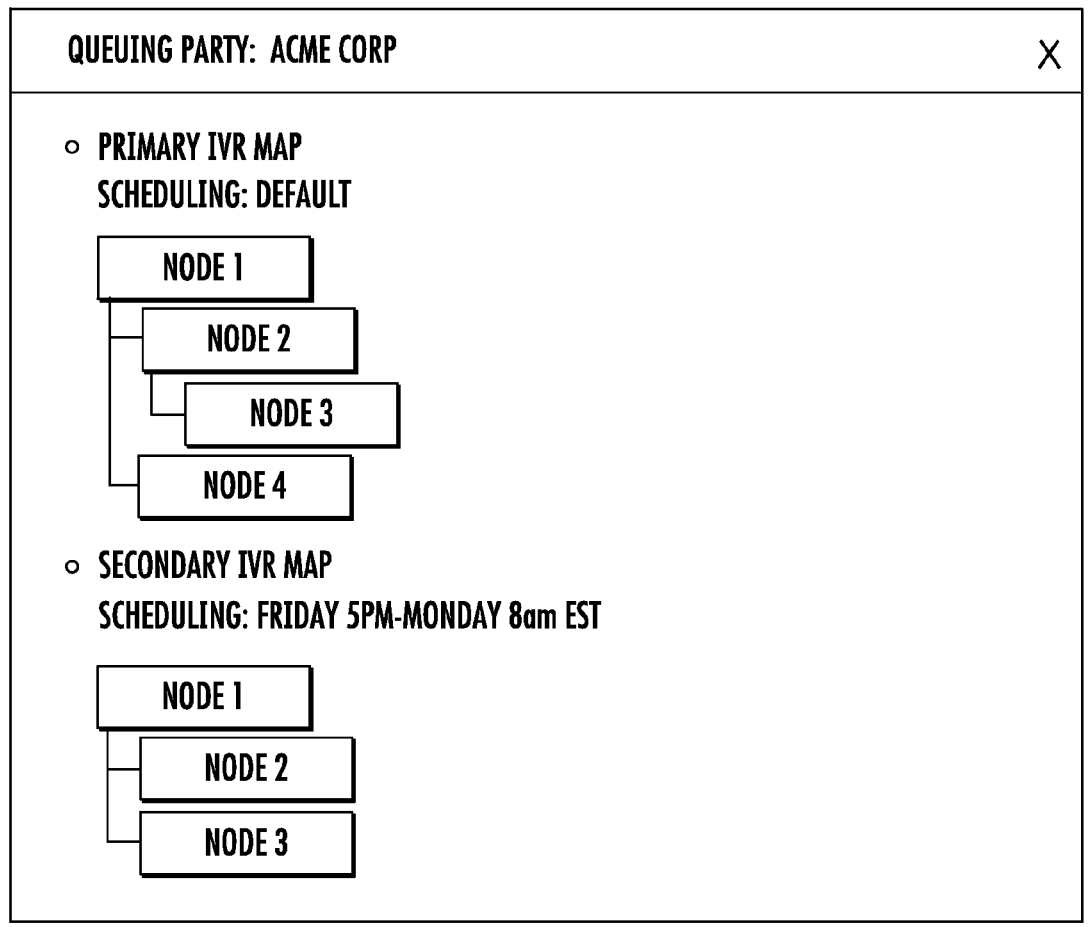
FIG. 5 is an illustration of an exemplary IVR database incorporating time-based IVR maps.

Some queuing parties may have regularly scheduled periods during which the IVR map is switched from the "primary IVR map" (the one heard the majority of the time) to a "supplementary IVR map". For example, waiting party may be presented with a supplementary IVR map on weekends or outside the office hours of the queuing party. In order to avoid unnecessary mapping effort, it is important for the IVRMS to recognize these supplementary IVR maps and not discard the primary IVR map. Some embodiments presented herein allow for such regular time-based changes by storing in the IVRMDB the supplementary IVR maps along with the scheduling information associated with each map. Indeed a queuing party may have multiple IVR maps corresponding to different time periods or for any other reason, and the IVRMS recognizes and builds multiple IVR maps correspondingly. FIG. 5 shows an illustrative diagram of this relationship in the IVRMDB.

Non-Essential Text

Some queuing parties may have prompts in their IVR map where some of the text in the prompt changes frequently, even though the node's commands do not change. This text is referred to as "non-essential text". Some embodiments presented herein allow the editor to designate blocks of text as non-essential text in order to avoid unnecessary mapping effort.

One benefit of the embodiments presented herein is to provide a system and method that allows the creation of an IVR map for a queuing party in a way that requires no changes to the communication system of the queuing party.

Another benefit of the embodiments presented herein is to provide such a system and method in a way that is transparent to the queuing party, requires no negotiation with the queuing party and requires no cooperation from the queuing party.

Another benefit of the embodiments presented herein is to provide such a system and method in a way that stays synchronized with any changes to the company's IVR map.

Many modifications and other embodiments of the invention will come to the mind of one skilled in the art having the benefit of the teachings presented in the foregoing descriptions and associated drawings. Therefore, it is understood that the invention is not to be limited to the specific embodiments disclosed, and that modifications and embodiments are intended to be included within the scope of the appended claims.

That which is claimed is:

1. An interactive voice response mapping system (IVRMS) used in a transaction between a waiting party and a queuing party, the queuing party having a queuing calling system (QCS), the IVRMS adapted to communicate with the QCS via at least one of DTMF tones, voice cues, and software commands to extract navigational information from the QCS and at least partially generate an IVR map of the QCS, wherein the IVRMS is adapted to perform an IVR map validation by connecting with the QCS and issuing appropriate commands to reach nodes in the IVR map, and wherein the IVRMS designates at least one queuing party as having a frequently changing QCS and performs frequent IVR map validation for the at least one queuing party.

2. The IVRMS of claim 1 wherein the IVRMS is adapted to process audio communications from the QCS and convert it to at least one of text and graphical representation.

3. The IVRMS of claim 1 wherein the IVRMS is adapted to compare audio communications from the QCS with an existing IVR map to validate and/or modify the existing IVR map.

4. The IVRMS of claim 1 wherein the IVRMS further comprises an IVR map editing interface.

5. The IVRMS of claim 4 wherein the IVRMS is adapted to allow an editor to perform at least one of correcting mistakes in an automated speech-to-text conversion process, removing text that is not relevant for visual navigation, correcting the structure of an IVR map via adding, and removing or changing commands.

6. The IVRMS of claim 1 wherein the IVRMS performs the IVR map validation on a regular schedule for at least one queuing party.

7. The IVRMS of claim 1 wherein a queuing party has more than one IVR map and wherein the IVRMS identifies the queuing party and builds more than one IVR map correspondingly.

8. The IVRMS of claim 1 wherein the IVRMS is adapted to identify non-essential text in order to avoid unnecessary mapping.

9. A method used in a transaction between a waiting party and a queuing party, the queuing party having a queuing calling system (QCS), the method comprising:
communicating with the QCS using at least one of DTMF tones, voice cues, and software commands to extract navigational information from the QCS and at least partially generate an IVR map of the QCS;
performing an IVR map validation by connecting with the QCS and issuing the appropriate commands to reach nodes in the map;
designating at least one queuing party as having a frequently changing QCS; and
performing frequent IVR map validation for the at least one queuing party.

10. The method of claim 9, further comprising processing audio communications from the QCS and converting it to at least one of text and graphical representation.

11. The method of claim 9, further comprising comparing audio communications from the QCS with an existing IVR map to validate and/or modify the existing IVR map.

12. The method of claim 9, further comprising providing a map editing interface.

13. The method of claim 12 wherein the method allows an editor to perform at least one of correcting mistakes in an automated speech-to-text conversion process, removing text that is not relevant for visual navigation, correcting the structure of an IVR map via adding, and removing or changing commands.

14. The method of claim 9, further comprising performing the IVR map validation on a regular schedule for at least one queuing party.

15. The method of claim 9 wherein a queuing party has more than one IVR map and wherein the method further comprises identifying the queuing party and building more than one IVR map correspondingly.

16. The method of claim 9, further comprising identifying non-essential text in order to avoid unnecessary mapping.

* * * * *